UNITED STATES PATENT OFFICE.

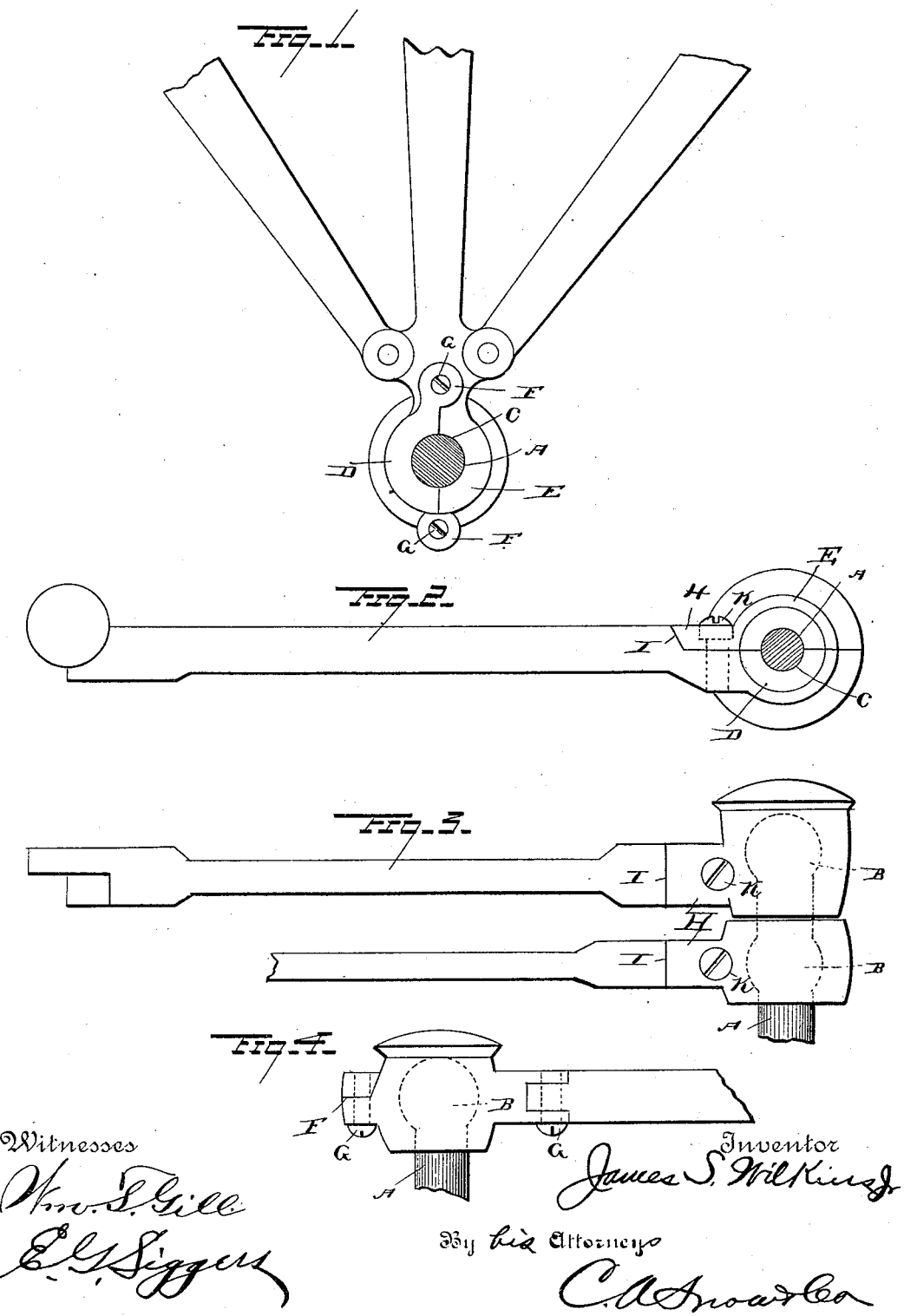

JAMES STUART WILKINS, JR., OF KEENE, NEW HAMPSHIRE.

JOINT FOR VEHICLE-TOPS.

SPECIFICATION forming part of Letters Patent No. 352,637, dated November 16, 1886.

Application filed August 6, 1886. Serial No. 210,220. (No model.)

*To all whom it may concern:*

Be it known that I, JAMES STUART WILKINS, Jr., a citizen of the United States, residing at Keene, in the county of Cheshire and State of New Hampshire, have invented a new and useful Improvement in Joints for Vehicle-Tops, of which the following is a specification.

My invention relates to an improvement in joints for vehicle-tops; and it consists in the peculiar construction and combination of devices, that will be more fully set forth hereinafter, and particularly pointed out in the claims.

In the drawings, Figure 1 is an elevation of the bows of a buggy-top provided with my improved joint. Fig. 2 is a similar view of one section of the jointed arms for a buggy-top provided with my improved form of joint. Fig. 3 is a top plan view of a section of a jointed arm provided with my improved joint. Fig. 4 illustrates a modified form of the joint.

A represents a bearing, and B represents a ball formed on the said bearing.

C represents a socket with which the bows or jointed arms of a folding vehicle-top are provided. One half of the socket is formed integrally with the bows or arm, as at D, and the other half of the socket is formed separately, as at E. When the two sections D and E are clamped on the ball B, a ball-and-socket bearing is formed, as will be very readily understood.

As shown at Fig. 1, the sections D and E of the socket are provided with ears F, which are adapted to bear against each other, and clamping-screws G pass transversely through the said ears and clamp the sections of the socket firmly together on the ball-bearing.

As shown in Figs. 2 and 3, one of the sections of the socket is formed with a projecting ear, H, which fits in a recess, I, made in the opposing section, and a clamping-screw, K, extends transversely through the ear H and enters a threaded opening made in the opposing section of the socket and secures the two sections of the socket together, so as to clamp the ball-bearing between them.

By providing the bows and jointed arms of a buggy-top with the ball-and-socket bearings, as hereinbefore described, the same are firmly held in place, are not likely to work loose, but may be readily taken apart when desired.

I am aware that it has been heretofore proposed to provide the standards for the canopies of children's carriages with balls at their lower ends, and to provide brackets secured to the carriage-body with hemispherical cavities to form sockets for the spheres on the ends of the standards, thus forming universal joints whereby the canopy may be swung in any direction over the carriage; but such is not my construction, and this, therefore, I disclaim. This construction is not practicable for use in vehicle-tops, inasmuch as the universal movement permitted would be highly objectionable, as is obvious.

Having thus described my invention, I claim—

1. The bows or jointed arms of a vehicle-top having one part, D, of the sockets formed integrally therewith, the other portion, E, of the sockets being formed separately therefrom and clamped to the part D, in combination with the bearing A, having the ball (one or more) secured between the sections of the socket, whereby a ball-and-socket bearing is formed to permit the bows or arms to be turned only in one direction, as set forth.

2. The sockets carried by the bows or jointed arms of a vehicle-top, in combination with the bearing A, independent of the bows or jointed arms, and the ball (one or more) on the bearing A, which ball or balls are fitted in the socket so as to form a ball-bearing, but not a ball-and-socket joint, as set forth.

In testimony that I claim the foregoing as my own I have hereto affixed my signature in presence of two witnesses.

JAMES STUART WILKINS, JR.

Witnesses:
ALICE J. DAVIS,
MARTIN S. BARDEN.